(12) United States Patent
Davis et al.

(10) Patent No.: US 9,519,318 B2
(45) Date of Patent: Dec. 13, 2016

(54) CARRIER WITH MULTIPLE STORAGE DEVICES HAVING DIFFERENT FORM FACTORS

(71) Applicant: Xyratex Technology Limited, Havant (GB)

(72) Inventors: David M. Davis, Portsmouth (GB); Alexander C. Worrall, Waterlooville (GB); Christopher J. Girard, Apopka, FL (US)

(73) Assignee: Xyratex Technology Limited, Havant (GB)

( * ) Notice: Subject to any disclaimer, the term of this patent is extended or adjusted under 35 U.S.C. 154(b) by 43 days.

(21) Appl. No.: 14/701,191

(22) Filed: Apr. 30, 2015

(65) Prior Publication Data

US 2015/0362965 A1    Dec. 17, 2015

(30) Foreign Application Priority Data

Jun. 12, 2014   (GB) .................................. 1410468.1

(51) Int. Cl.
| G06F 1/16 | (2006.01) |
| H05K 5/00 | (2006.01) |
| G06F 1/18 | (2006.01) |

(52) U.S. Cl.
CPC .................... *G06F 1/187* (2013.01)

(58) Field of Classification Search
CPC ...... G06F 1/187; G06F 1/1656; G06F 1/1658; G06F 1/183; G06F 1/184; G06F 1/185; G06F 1/186

USPC .......................... 361/679.31–679.4, 724–727
See application file for complete search history.

(56) References Cited

U.S. PATENT DOCUMENTS

| 6,459,571 | B1 * | 10/2002 | Carteau | G06F 1/184 |
| | | | | 312/35 |
| 6,751,694 | B2 * | 6/2004 | Liu | G06F 13/409 |
| | | | | 439/638 |
| 8,508,929 | B2 * | 8/2013 | Anguiano-Wehde | G06F 1/187 |
| | | | | 361/679.33 |
| 2004/0088482 | A1 * | 5/2004 | Tanzer | G11B 33/128 |
| | | | | 711/114 |
| 2007/0233781 | A1 * | 10/2007 | Starr | G11B 33/126 |
| | | | | 709/203 |
| 2008/0239648 | A1 * | 10/2008 | Okamoto | G06F 1/183 |
| | | | | 361/725 |
| 2009/0273896 | A1 * | 11/2009 | Walker | G06F 1/187 |
| | | | | 361/679.33 |
| 2010/0281199 | A1 * | 11/2010 | Fu | G06F 13/409 |
| | | | | 710/300 |

(Continued)

FOREIGN PATENT DOCUMENTS

| CN | 102376334 A | 3/2012 | |
| KR | WO 2011007989 A2 * | 1/2011 | ........... G11B 17/056 |
| WO | 2011/007989 A2 | 1/2011 | |

*Primary Examiner* — Nidhi Thaker

(74) *Attorney, Agent, or Firm* — Hall Estill Attorneys at Law

(57) ABSTRACT

Storage systems, carriers, enclosures and support PCBs connecting to a first storage device of a first form factor such as a hard disc drive (HDD), a dongle within a storage carrier coupled to the first storage device, and a second storage device such as a solid-state drive (SSD) coupled to the dongle having a second form factor different than or smaller than the first form factor.

14 Claims, 5 Drawing Sheets

(56) References Cited

U.S. PATENT DOCUMENTS

2011/0090635 A1* 4/2011 Liu .................. G11B 33/124
             361/679.33
2012/0113581 A1   5/2012 Anguiano-Wehde et al.

* cited by examiner

CARRIER WITH MULTIPLE STORAGE DEVICES HAVING DIFFERENT FORM FACTORS

RELATED APPLICATIONS

This application makes a claim of priority under 35 U.S.C. 119(a) to copending Patent Application No. GB1410468.1 filed Jun. 12, 2014, the contents of which are hereby incorporated by reference.

SUMMARY

Various embodiments of the present disclosure are generally directed to an apparatus for storing data.

In some embodiments, a storage carrier is configured for insertion into a multi-device storage enclosure. The storage carrier includes a first storage device of a first form factor, a dongle within the carrier coupled to the first storage device, and a second storage device coupled to the dongle having a different, second form factor.

In other embodiments, a multi-device storage enclosure has an enclosure housing and a plurality of storage carriers adapted to be removably inserted into the enclosure housing. Each of the storage carriers includes a carrier housing which encloses a first storage device having a first form factor, a second storage device having a second form factor smaller than the first form factor, and a dongle which electrically interconnects the first and second storage devices.

In other embodiments, a storage system has a multi-device storage enclosure housing having a plurality of slots each for receiving a storage carrier, and a plurality of storage carriers. At least one of the storage carriers has a first storage medium of a first form factor, a dongle within the storage carrier coupled to the first storage medium, the dongle having mounted thereon a second storage medium of a smaller, second form factor.

In still other embodiments, an apparatus has a printed circuit board (PCB) sized such that the PCB can fit transverse to a longitudinal direction of a carrier, the PCB having first, second and third connectors. The first connector is configured for electrical connection to a hard disc drive (HDD). The second connector is configured for electrical connection to a flash storage device mounted on the PCB. The third connector is configured for electrical connection to a midplane of a larger storage enclosure to provide electrical connection from the larger storage enclosure to the HDD and the flash storage device. Control electronics on the PCB are configured to transmit data to and from the HDD and the flash storage device.

These and other features and aspects of various embodiments can be understood from a review of the following detailed description and the accompanying drawings.

DETAILED DESCRIPTION

Figure 1:
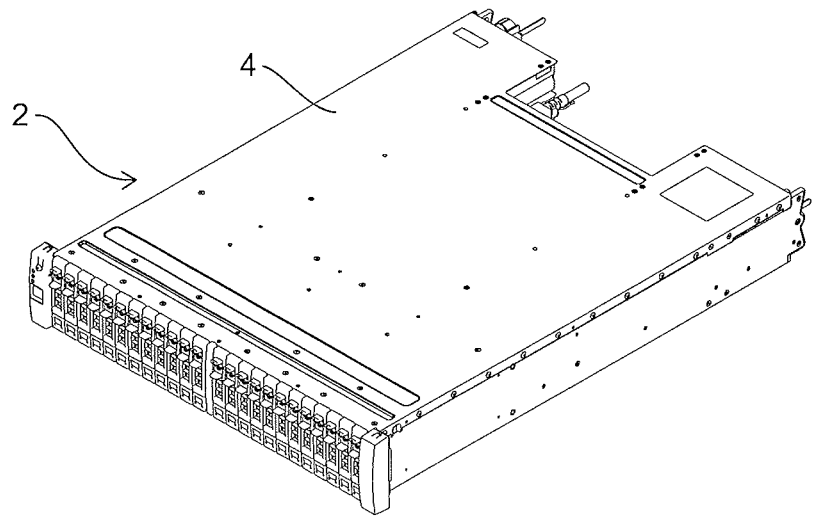
FIGS. 1-3 show views of an exemplary storage enclosure suitable for use with various embodiments of the present disclosure.

The performance of storage devices that use rotatable data recording media, such as hard disc drives (HDDs), can be slower compared to storage devices that use solid-state data recording media, such as solid-state drives (SSDs). Nevertheless, HDDs represent a relatively low cost type of storage device. Many storage infrastructures are generally designed around HDDs, including mass storage systems such as but not limited to cloud based computing networks, etc.

To address the issue relating to the speed of performance of HDDs, measures have been undertaken to improve HDD performance. One approach implements a smaller number of SSDs within a larger array of HDDs in a multi-device storage system. The lower cost HDDs can provide large scale storage for the bulk of the data stored by the system, and the higher cost SSDs can provide faster performance for higher value or strategically selected data stored by the system. Another approach is the use of "hybrid HDDs" which incorporate both rotating and solid-state data recording media into a single hybrid data storage device.

One problem with rotating drives such as HDDs is that it can be quite slow to locate and address a particular region on the rotatable media. Thus, the writing or retrieval of data to or from the rotatable media can take a relatively long time. For some types of data, there may be a particular need to enable the data to be accessed more quickly.

Accordingly, various embodiments of the present disclosure are generally directed to a carrier for a larger multi-device storage enclosure that incorporates multiple storage devices having different form factors. As explained below, some embodiments provide the storage carrier with a first storage device of a first form factor, a dongle within the carrier coupled to the first storage medium, and a second storage device coupled to the dongle having a different, second form factor. The multi-device storage enclosure may be operated as a public or private cloud storage system or networked storage rack in a data center.

In some embodiments, the first storage device is a hard disc drive (HDD), the second storage device is a solid-state device (SSD) implemented as flash storage memory, and the dongle is a printed circuit board (PCB) supporting control electronics for the HDD and the SSD. The first form factor of the HDD may be a 3.5 inch form factor or a 2.5 inch form factor, and the second form factor of the SSD may be an M.2 standard form factor. Other formats can be used.

In further embodiments, a bridge device is incorporated into the carrier. The bridge device presents the respective first and second storage devices with different logical unit numbers (LUNs) thereby allowing a host connected to the carrier to separately address these respective devices. In other embodiments, the carrier has an overall set of dimensions configured to accommodate the first form factor of the first storage device, and the dongle and the second storage device fit within the overall set of dimensions of the carrier.

In this way, a standard sized, rectilinearly shaped carrier can be provided for use in a multi-device storage enclosure, and additional storage capabilities can be supplied within the carrier via the dongle and the second data storage device without expanding the size of the carrier.

Figure 2:
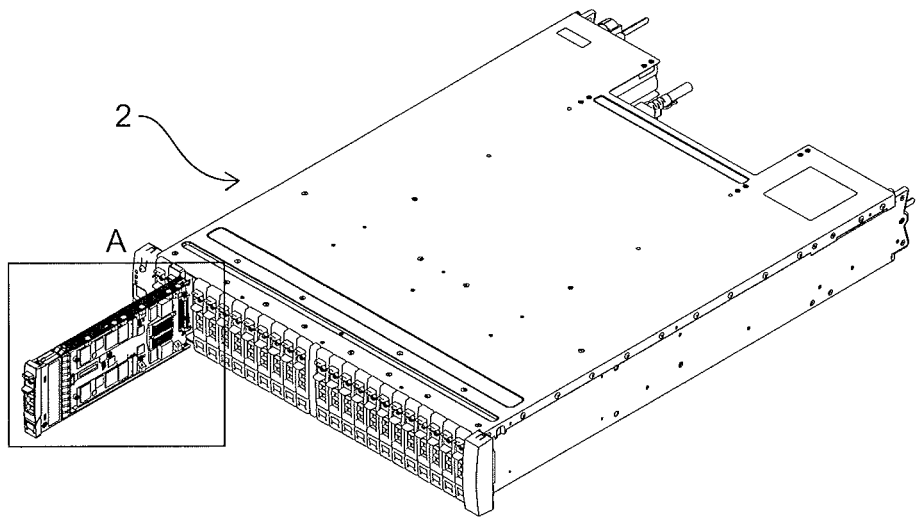
Figure 3:
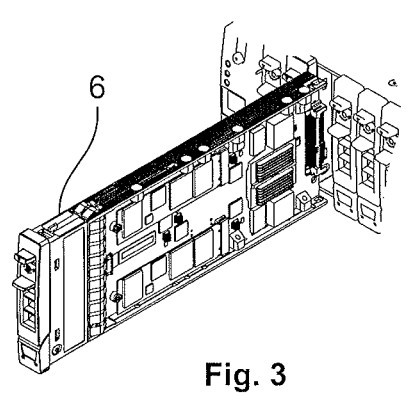

These and other features of various embodiments can be understood with reference to FIGS. 1-3 which illustrate a schematic representation of a storage enclosure 2. The enclosure 2 is generally rectangular and has a housing 4 into which are provided slots sized to receive a plurality of storage carriers 6. The carriers 6 each have a substantially rectilinear shape and are arranged to fit in a vertical, side-by-side adjacent configuration within the enclosure 2. A plural number of enclosures such as 2 may be stacked upon one another in a larger rack or cabinet type storage system.

In the example shown in FIG. 3, the storage within the carrier 6 is provided entirely as solid state storage (e.g., SSDs), representing a first storage medium of a defined form factor. The storage carriers 6 can be rectilinearly sized to accommodate hard disc drives (HDDs) of a selected form factor, for use in storing SSDs and/or HDDs as required.

Figure 4:
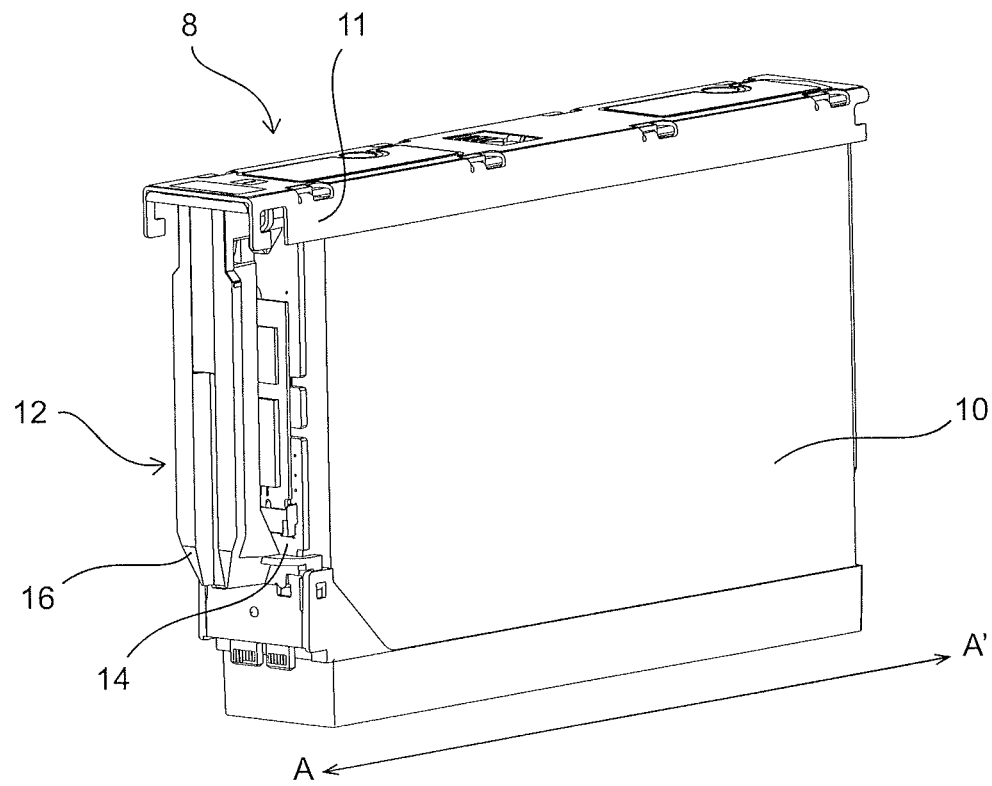
FIG. 4 is a perspective view of a storage carrier including an SSD dongle in accordance with some embodiments of the present disclosure.
Figure 5:
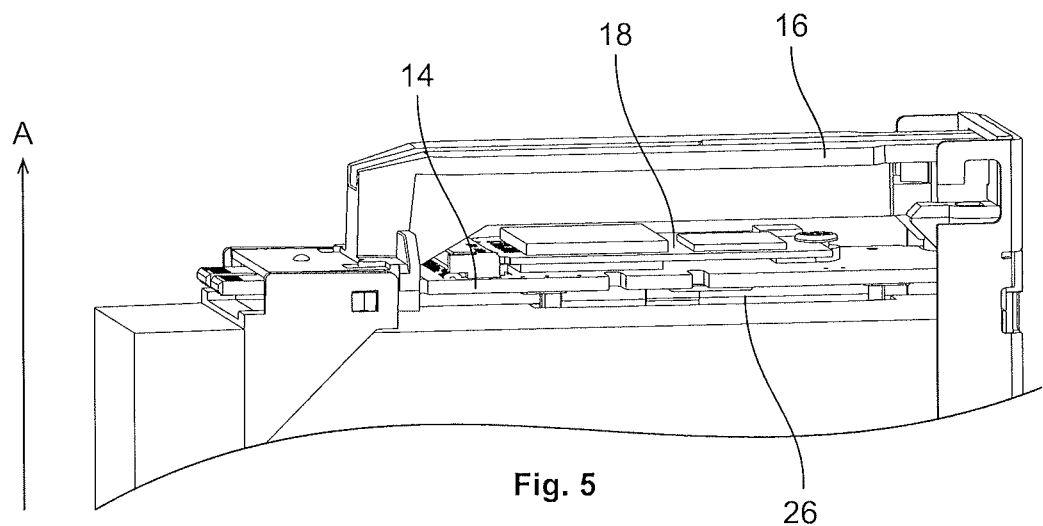
FIG. 5 is a detailed view of the SSD dongle of FIG. 4.

FIGS. 4 and 5 provide a storage carrier 8 in accordance with some embodiments. The carrier 8 is suitable for use in a multi-device storage enclosure, such as but not limited to the storage enclosure 2 of FIGS. 1-3. The carrier 8 has a rectilinear shape sized to house a hard disc drive (HDD) 10 within a housing (frame) 11. The carrier 8 thus holds a first storage medium of a defined form factor, which in this example is the HDD having a 3.5 inch form factor.

As will be appreciated, a 3.5 inch form factor drive has outer length and width dimensions of nominally 146 millimeters, mm (5.25 inches, in) by nominally 101.6 mm (4 in). This is merely exemplary and is not limiting as other types of storage devices and form factors for the first storage medium can be used as desired, including HDDs of 2.5 inch form factor (101.6 mm×73 mm), etc. The 3.5 and 2.5 inch form factors can have respective thickness dimensions of various values, such as on the order of about 25.4 mm (1 in) or less.

A dongle 14 is incorporated into the carrier 8. The dongle 14 takes the form of a printed circuit board (PCB) supporting various data routing and control hardware. Other forms of dongles can be used, including dongles that utilize cables, flex circuits, etc. In some cases, the dongle supports controller circuitry which controls the writing of data to and the reading of data from the HDD 10.

The housing 11 is sized such as to define a region 12 at one end thereof within which the dongle 14 can be provided. In this example, the dongle 14 is generally planar and sized such that it can fit transverse to a longitudinal direction A-A' of the carrier 8. This means that the dongle 14 can fit within the space that is typically available within such a carrier and not add overall to the aggregate volume of the carrier. As shown in FIGS. 4-5, the dongle 14 extends along a thickness dimension of the HDD 10, although other configurations are envisioned.

A suitable guide 16 can be provided to guide the carrier 8 into a slot within a storage enclosure. The arrangement of FIGS. 4-5 uses a top loaded enclosure, in contrast to the side-loaded enclosure configuration of FIGS. 1-3. Nonetheless, the carrier 8 can be readily adapted to fit within the enclosure 2. Electrical connectors 20 and 22 are configured to engage with corresponding connectors within the enclosure when the carrier 8 is inserted into an enclosure slot.

A second storage medium is denoted at 18. The second storage medium takes the form of a solid-state drive (SSD), although such is merely exemplary and is not limiting. The second storage medium 18 is positioned within the carrier 8, and more particularly, within the overall envelope of the carrier defined by the guide 16, with the envelope being the outermost volumetric boundary of the carrier at any position. The SSD can be mounted to a second PCB that is parallel to the PCB of the dongle 14, or the SSD can be incorporated directly into the dongle.

In this way, the HDD 10 can be viewed as having opposing top and bottom surfaces bounded by a length dimension L and a width dimension W of the HDD, opposing side surfaces bounded by L and a thickness dimension T of the HDD, and opposing end surfaces bounded by W and T. In FIG. 4, L is parallel to direction A-A' and L>W>T. As can be seen, the dongle 14 is arranged in adjacent parallel relation to a selected one of the opposing end surfaces and having overall length and width dimensions equal to or smaller than the selected one of the opposing end surfaces; that is, the overall footprint size of the dongle 14 is equal to or less than the areal extent of W×T. Stated another way, the combined areal extent of the dongle and the SSD are equal to or less than the areal extent of a selected side of the first form factor of the first storage device.

It follows that the overall size of the carrier 8 is no different from what it would be without the dongle 14 and second storage medium 18, and the carrier 8 will continue to fit within the associated storage enclosure, including the storage enclosure 2. The dongle, in combination with the second storage medium 18, provides additional storage capacity to the carrier over and above that which is provided by the first storage medium 10.

In this example, where the second storage medium 18 is provided as an SSD, the medium provides fast access to data stored thereon. This provides a significant advantage in that the faster storage capabilities of the SSD enables data to be written to and read from the SSD more quickly than it can be written to or read from the rotating medium of the HDD (first storage medium 10) within the carrier 8.

In the present example, the second storage medium 18 is provided as an M.2 module. Thus, the dongle 14 has mounted on it an SSD device. In some embodiments, the dongle includes an SAS/SATA bridge device such as a controller device. The small SSD could be an M.2 2242 compliant device, but could alternatively take other forms such as an integrated SSD ASIC mounted on the PCB (dongle 14). Mating engagement of the carrier 8 into a storage enclosure such as 2 results in the interconnection of the dongle 14 to a midplane or other interconnection mechanism within the enclosure, and both the HDD and the SSD are thereafter accessed through the dongle.

At this point it will be appreciated that M.2 refers to a current generation SSD standard that governs interconnectivity and form factor characteristics for expansion card PCBs. M.2, also referred to as Next Generation Form Factor (NGFF), is a specification for internally generated computer expansion cards and associated connectors. M.2 compliant modules are generally rectangular in shape with an edge connector along one side. The M.2 standard allows a number of module widths including 12, 16, 22 and 30 millimeters, mm, and a number of module lengths including 16, 26, 30, 38, 42, 60, 80 and 110 mm. While not limiting, commonly employed M.2 form factors include the so-called 2242 (22 mm in width by 42 mm in length), 2260 (22 mm in width by 60 mm in length) and 2280 (22 mm in width by 80 mm in length) form factors. Other form factors and standards can be used, so reference to the M.2 standard and the M.2 based form factors is merely exemplary and is not limiting.

Figure 7:
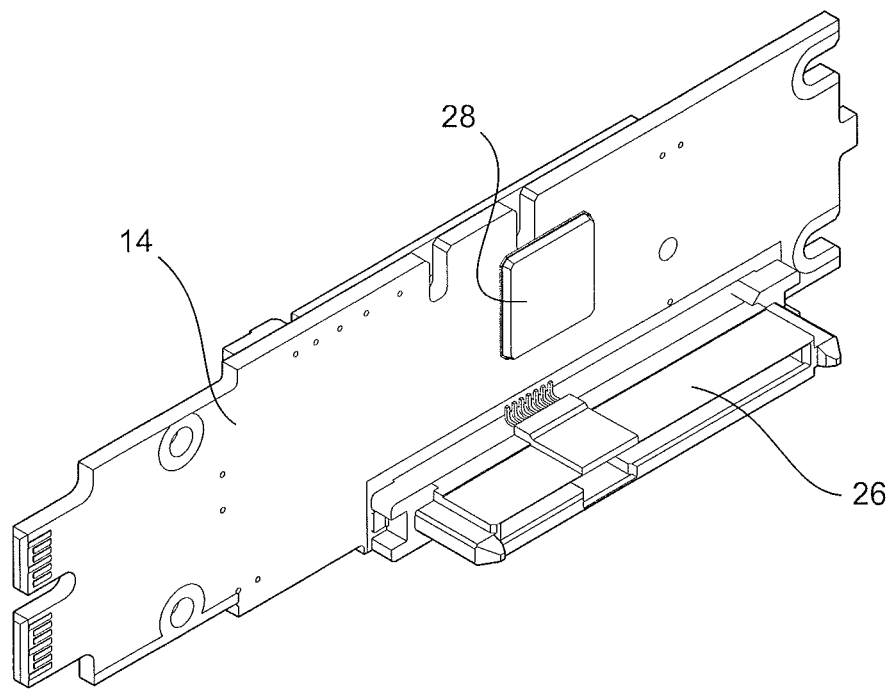
FIG. 7 is a view of the dongle of FIG. 6 shown from an underside vantage point.
Figure 10:
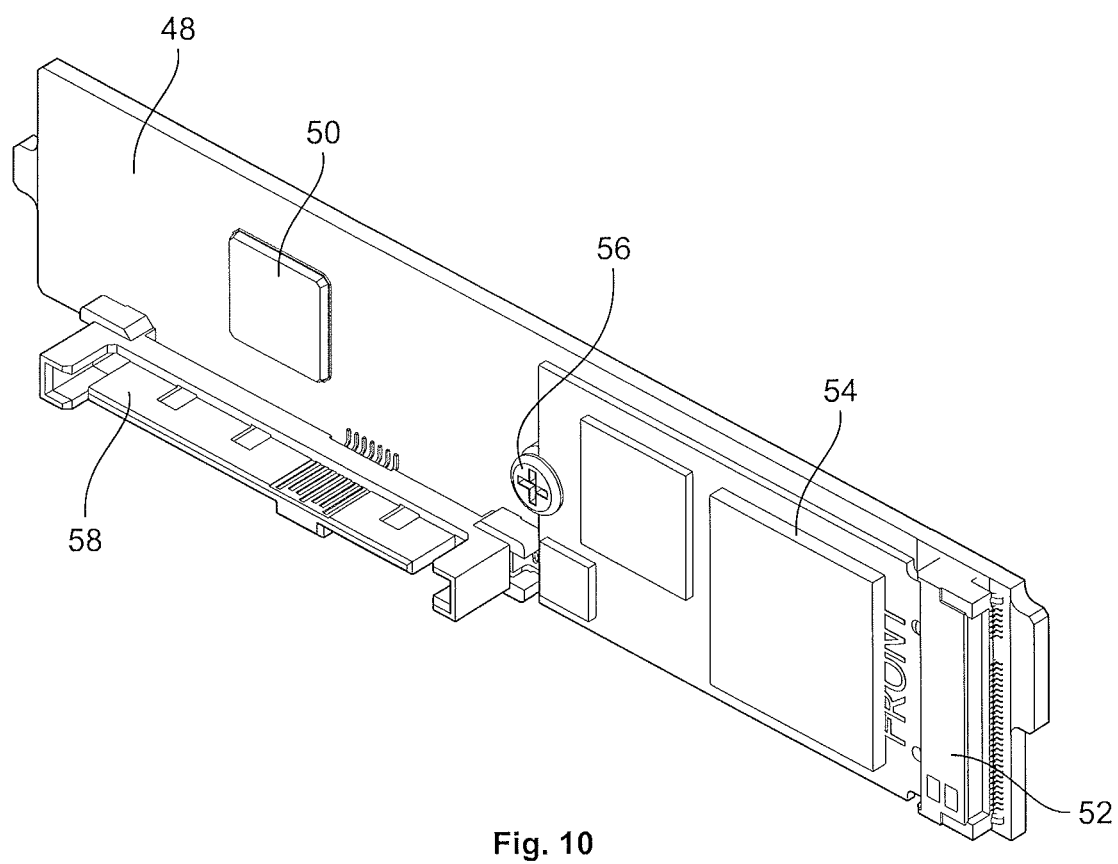
FIG. 10 is a schematic representation of the SSD dongle used in FIGS. 8 and 9 showing a dual SAS/SATA bridge.

As further shown in FIGS. 7 and 10, a bridge device 26 presents the rotating media of the first storage device 10 within the carrier 8 and the solid state media of the second storage device 18 within the carrier as different logical unit numbers (LUNs) thereby allowing a host connected to the carrier 8 to separately address these media. This configuration can provide a number of advantages, such as allowing data stored across multiple devices to be accessed in a more efficient manner. For example, a system which has a server which provides look-up on the location of other files would be constrained on the number of SSD drives and the access rate of those drives in providing the data. If such a system were to distribute that data across the dongle mounted SSDs within the storage system, the capacity would grow proportionately to the number of drives, and the access would be eased as each one would have a path to the controller.

Accordingly, various embodiments of the present disclosure provide a carrier such as 8 capable of housing multiple storage media of different defined form factors. In some embodiments, the carrier includes a first storage device having a first form factor such as but not limited to a commonly available HDD form factor such as a 3.5 inch form factor, and the second storage device has a different, second form factor such as but not limited to an SSD form factor standard such as an M.2 device.

Because the form factor of the second storage device is smaller than the form factor of the first storage device, both devices can fit within the form factor of the first storage device. For example, this arrangement enables the carrier 8 to fit into a slot as provided in a 3.5 inch storage system enclosure. Thus, referring again to FIGS. 1 and 2, the carriers 8 would from the outside look substantially the same and be sized the same as the carriers used in the enclosures of FIGS. 1 and 2. One difference would be that each carrier 8 includes multiple storage devices of different form factors interconnected by the dongle 14.

The relative size of the M.2 form factor SSDs allows a smaller device such as a device corresponding to the M.2 2242 standard to be fitted to the dongle 14. In some embodiments, other form factors may be used as the second storage medium, such as but not limited to the M.2 2260 and M.2 2280 form factors. As noted above, the second form factor storage device is not limited to an M.2 form factor. In another example, an integrated SSD ASIC mounted on a PCB is provided. The preferred capacity range for the second form factor storage device can be between 16 GB and 128 GB, although as available memory densities increase the amount could increase correspondingly.

A further advantage that the storage carrier 8 described herein provides a hybrid carrier arrangement in cases where there is a relationship between low priority bulk data and high priority look-up or reference data. In these types of systems, the ability to provide and scale the storage capacity for the look-up data in parallel to the bulk data is particularly advantageous. In the present case, the presence of an amount of fast-access solid state storage within the carrier directly addresses this. In such cases, the SSD can be used as the main storage medium to provide high performance but limited capacity. During the lower performance period, the SSD data can be copied to the first storage medium or rotating medium for permanent storage.

A further application involves low power operation environments. In these cases, the first storage medium can be spun down with a proportion of its data available on the low power SSD or other second storage medium. In this case, only the SAS/SATA bridge and the SSD are powered, providing a very low operating power combined with access to key data. The data selected for copying to the SSD could be calculated by a system algorithm arranged to minimize the need to spin up the first storage medium for occasional use. These are merely examples of uses of the storage carrier described herein. The skilled person will appreciate that there are many others as well.

Figure 6:
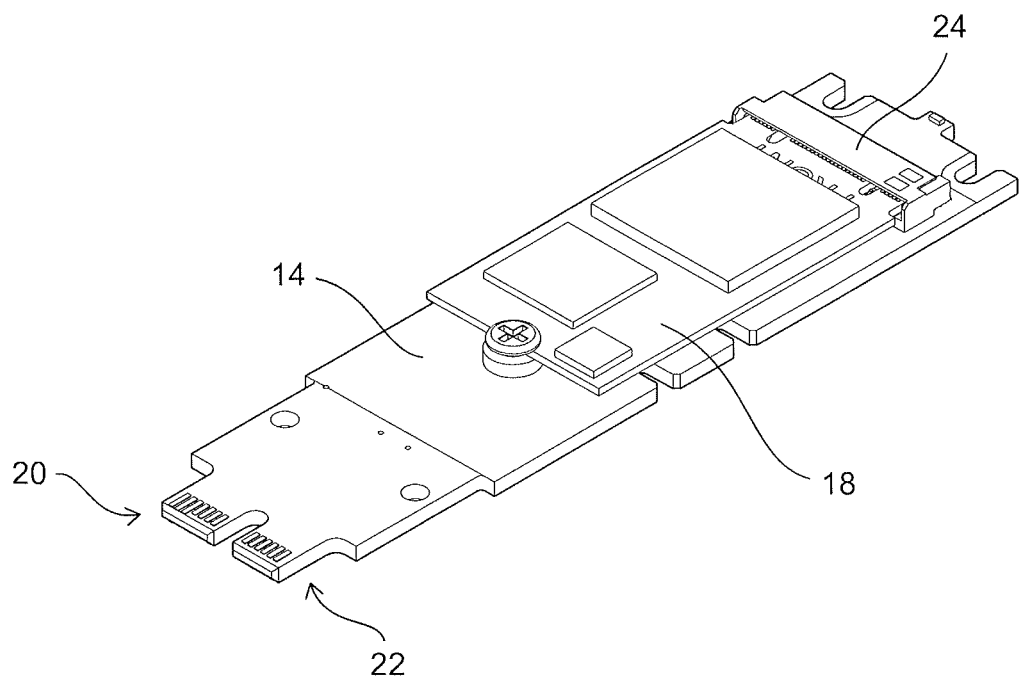
FIG. 6 is a schematic perspective view of the dongle used in the carriers of FIGS. 4 and 5.

FIG. 6 is a schematic representation of dongle 14 shown in FIGS. 4 and 5. The dongle 14 has a solid state storage device 18 mounted thereon. As can be seen, the storage device 18 is an M.2 2242 SSD. The connectivity via the connectors 20 and 22 would be as required to enable data and power connection to the dongle and rotating medium within the carrier 8 and also the M.2 module 18. A connector 24 is provided on the dongle 14 to enable connection and connectivity to the SSD storage medium 18.

FIG. 7 shows another view of the dongle 14 of FIG. 6. A connector 26 is provided to interconnect with the HDD. A controller 28 such as in the form of a control IC is provided as a SAS/SATA bridge device to control communication of data to and from the HDD. It can be seen from FIGS. 5 and 7 that the direction of insertion of the dongle connectors 20, 22 into the midplane is orthogonal to the normal insertion direction of the HDD connector that mates with connector 26 (e.g., connectors 20, 22 are orthogonal to connector 26). This is exemplary and is not necessarily limiting.

Figure 8:
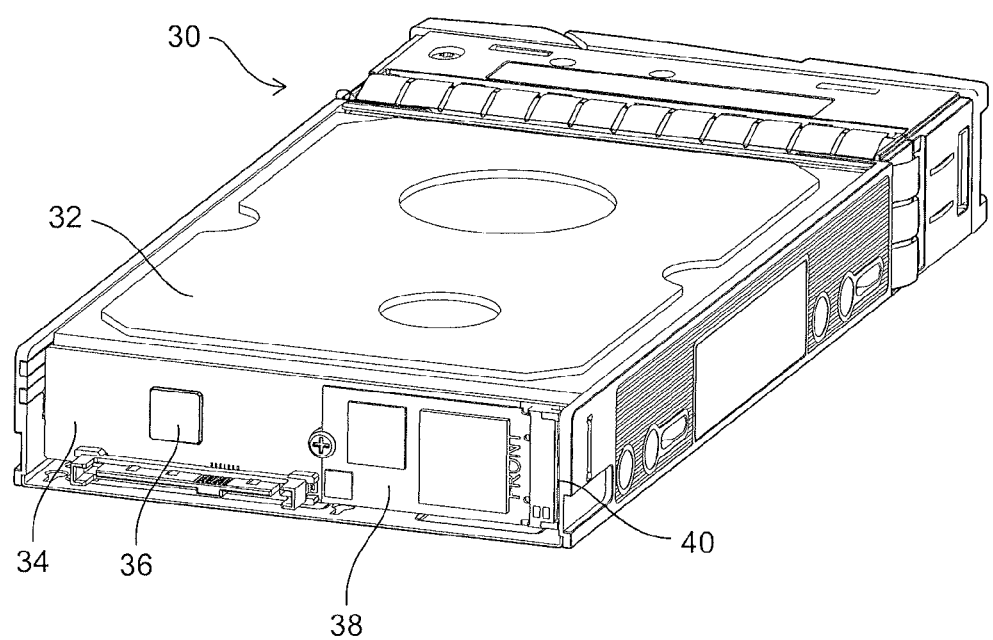
FIG. 8 is a schematic view of an alternative storage carrier including an SSD dongle in accordance with further embodiments.
Figure 9:
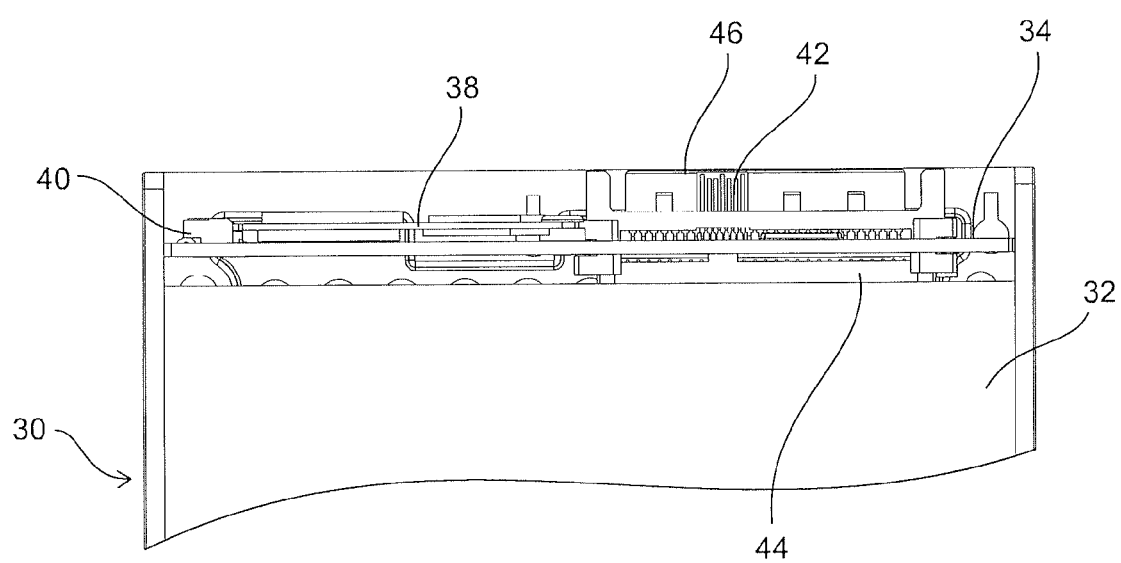
FIG. 9 is a close-up of the storage carrier of FIG. 8 showing in more detail the SSD dongle.

FIGS. 8 and 9 show schematic representations of an alternative carrier 30. The carrier 30 houses within it a hard disc drive (HDD) 32 with a dongle 34 mounted at one end thereof. Again, as in the examples shown above, the dongle 34 is generally planar and is arranged within the carrier at one end thereof and transverse to the longitudinal axis AA' of the carrier. The dongle 34 has provided on it a controller 36, also referred to as a bridge.

A solid state storage device of a second defined form factor 38 is provided, coupled to the dongle 34 via a connector 40. Again, due to the flat planar nature of the solid state storage device 38 it is able to fit within the envelope of the carrier 30 such that the carrier can continue to be inserted into a storage enclosure for which it was originally designed even without the presence of the solid state device 38. A connector device 42 is provided having a rotating drive connector 44 at one end for coupling to the rotating drive 32 and a host connector 46 at its other end for connecting to the host or enclosure midplane.

FIG. 10 is another view of the dongle 30 in FIGS. 8 and 9. The dongle includes a dual SAS/SATA bridge and a solid state storage device. In the example shown, the dongle comprises a support PCB 48 upon which is mounted a controller or bridge 50 which again, might be an IC controller device. A connector 52 is provided to allow connection to a solid state storage device 54 of an M.2 format. As explained above, any M.2 form factor could be used, including but not limited to the 2242 and 2260 form factors.

A fixing device 56 such as a screw is provided to anchor the M.2 module to the dongle PCB 48. A host or midplane connector 58 is provided for connection to a host or midplane. A rotating drive connector cannot be seen in FIG. 10, but is shown in FIG. 9 and serves to couple data between the rotating medium within the carrier and one or more controllers or hosts as explained above.

Generally there is described herein in some embodiments the connection of SATA storage media to a SAS system. However, it will be appreciated that with the appropriate silicon or hardware, (Switch/Expander/Bridge etc) the system and method described herein could equally apply to a variety of media configurations. Other examples include SAS to SAS, PCIe to PCIe, PCIe to SATA Express or Ethernet to Kinetic, amongst others. It will be noted that the SSD 54 is provided substantially coplanar with the dongle PCB 48 (and in this example transverse to the longitudinal axis of the carrier). This means that in effect, very little additional volume is required. Indeed, the flat arrangement of the solid state M.2 module means that it actually fits within the height of the dead space defined by the host or midplane connector 58. It can therefore be incorporated onto the dongle without any effect on the functionality of the hard disc drive or its connector.

Thus, the present storage carrier enables incorporation of an SSD into the space originally used by a storage carrier with a first storage medium of a defined form factor. Typically, the SSD may be incorporated into the space within a carrier for a 3.5 form factor HDD, or indeed any other form factor storage medium, and would then fit within a drive slot within a storage enclosure designed for the corresponding form factor storage medium. No modification to the enclosure housing itself would be required.

A further advantage is that by providing a solid state storage device on a dongle within a storage carrier as disclosed herein, this inherently scales the capacity of the solid state storage in proportion with the rotating medium capacity of the first storage medium within the carrier. In other words, if a solid state storage device is provided for each of the rotating media then it follows that the solid state storage capacity will scale with the capacity of the rotating media within an enclosure. In addition, the solid state storage device is typically low power and thereby enables a low power storage system with immediate access to a proportion of its data.

Embodiments of the present disclosure have been described with particular reference to the examples illustrated. However, it will be appreciated that variations and modifications may be made to the examples described within the scope of the present disclosure.

What is claimed is:

1. A storage carrier configured for insertion into a multi-device storage enclosure, the storage carrier comprising a first storage device of a first form factor, a dongle within the storage carrier coupled to the first storage device, and a second storage device coupled to the dongle having a second form factor different than the first form factor, the storage carrier has an overall form factor that substantially corresponds to the first form factor, and the second form factor has an areal extent that is equal to or less than a selected facing side of the first form factor of the first storage device, the storage carrier further comprising a housing sized to enclose the first form factor of the first storage device with the dongle and the second storage device fitting within the housing, the first storage device comprising a hard disc drive (HDD), the second storage device comprising a solid-state device (SSD), the dongle comprising a printed circuit board (PCB) supporting control electronics for the HDD and the SSD, the HDD having opposing top and bottom surfaces bounded by a length dimension and a width dimension of the HDD, opposing side surfaces bounded by the length dimension and a thickness dimension of the HDD, and opposing end surfaces bounded by the width dimension and the thickness dimension, the dongle arranged in adjacent parallel relation to a selected one of the opposing end surfaces and having overall length and width dimensions equal to or smaller than the selected one of the opposing end surfaces.

2. The storage carrier of claim 1, wherein the housing has a generally rectilinear shape, and the dongle comprises a printed circuit board (PCB) substrate arranged at one end of the housing in a plane transverse to a longitudinal axis of the rectilinear shape.

3. The storage carrier of claim 1, wherein the first form factor of the HDD is a 2.5 inch form factor or a 3.5 inch form factor, and the second form factor of the SSD is an M.2 standard form factor.

4. The storage carrier of claim 1, wherein the second storage device is a solid-state device (SSD) having a form factor of nominally 22 mm in width by nominally 42 mm in length.

5. The storage carrier of claim 1, further comprising a bridge circuit which identifies the respective first and second data storage devices with different logical unit numbers (LUNs) to allow a host connected to the storage carrier to separately address the respective first and second data storage devices.

6. The storage carrier of claim 1, wherein the dongle is a support printed circuit board (PCB) having a first connector for connection to the first storage device, a second connector for connecting to the second storage device and a third connector for connection to a midplane of the multi-device storage enclosure, wherein data stored by the respective first and second storage devices pass through the third connector.

7. The storage carrier of claim 6, wherein the first connector is a SAS/SATA connector.

8. The storage carrier of claim 6, wherein the first connector is mated in a first insertion direction to the first storage device, and the third connector is mated in a second insertion direction to the midplane, the second direction orthogonal to the first direction.

9. A multi-device storage enclosure comprising an enclosure housing and a plurality of storage carriers adapted to be removably inserted into the enclosure housing, each of the storage carriers comprising a carrier housing which encloses a first storage device having a first form factor, a second storage device having a second form factor smaller than the first form factor, and a dongle which electrically interconnects the first and second storage devices, each of the storage carriers has an overall form factor that substantially corresponds to the first form factor, and the second form factor has an areal extent that is equal to or less than a selected facing side of the first form factor of the first storage device, the first storage device comprising a hard disc drive (HDD), the second storage device comprising a solid-state device (SSD), the dongle comprising a printed circuit board (PCB) supporting control electronics for the HDD and the SSD, the HDD having opposing top and bottom surfaces bounded by a length dimension and a width dimension of the HDD, opposing side surfaces bounded by the length dimension and a thickness dimension of the HDD, and opposing end surfaces bounded by the width dimension and the thickness dimension, the dongle arranged in adjacent parallel relation to a selected one of the opposing end surfaces and having overall length and width dimensions equal to or smaller than the selected one of the opposing end surfaces.

10. The multi-device storage enclosure of claim 9, further comprising a midplane within the enclosure housing, the dongle having a connector which engages the midplane to establish an electrical communication path to each of the first and second storage devices.

11. A storage system comprising: a multi-device storage enclosure housing having a plurality of slots each for receiving a storage carrier; and a plurality of storage carriers, at least one of the storage carriers having a first storage device of a first form factor, a dongle within the storage carrier coupled to the first storage device, the dongle having mounted thereon a second storage device of a smaller, second form factor, the at least one of the storage carriers has an overall form factor that substantially corresponds to the first form factor, and the second form factor has an areal extent that is equal to or less than a selected facing side of the first form factor of the first storage device, the at least one of the storage carriers further having a carrier housing sized to enclose the first form factor of the first storage device with the dongle and the second storage device fitting within the housing, the first storage device comprising a hard disc drive (HDD), the second storage device comprising a solid-state device (SSD), the dongle comprising a printed circuit board (PCB) supporting control electronics for the HDD and the SSD, the HDD having opposing top and bottom surfaces bounded by a length dimension and a width dimension of the HDD, opposing side surfaces bounded by the length dimension and a thickness dimension of the HDD, and opposing end surfaces bounded by the width dimension and the thickness dimension, the dongle arranged in adjacent parallel relation to a selected one of the opposing end surfaces and having overall length and width dimensions equal to or smaller than the selected one of the opposing end surfaces.

12. The storage system of claim 11, wherein the dongle comprises first, second and third connectors, the first connector mated in a first insertion direction to the first storage device, the second connector mated in a second insertion direction to the second storage device, and the third connector mated in a third insertion direction to a midplane of the storage system, the third insertion direction orthogonal to the first insertion direction.

13. A storage carrier comprising: a hard disc drive (HDD) having a selected form factor; a printed circuit board (PCB) sized such that the PCB can fit transverse to a longitudinal direction of the storage carrier, the PCB having first, second and third connectors; the first connector configured for electrical connection to the HDD; the second connector configured for electrical connection to a flash storage device mounted on the PCB; the third connector configured for electrical connection to a midplane of a larger storage enclosure to provide electrical connection from the larger storage enclosure to the HDD and the flash storage device; control electronics on the PCB configured to transmit data to and from the HDD and the flash storage device; the storage carrier has an overall form factor that substantially corresponds to the selected form factor of the HDD, and the storage carrier comprises a housing sized to enclose the HDD and the PCB, the HDD having opposing top and bottom surfaces bounded by a length dimension and a width dimension of the HDD, opposing side surfaces bounded by the length dimension and a thickness dimension of the HDD, and opposing end surfaces bounded by the width dimension and the thickness dimension, the PCB arranged in adjacent parallel relation to a selected one of the opposing end surfaces and having overall length and width dimensions equal to or smaller than the selected one of the opposing end surfaces.

14. The multi-device storage enclosure of claim 13, wherein the HDD has a 2.5 inch form factor or a 3.5 inch form factor, and flash storage device has an M.2 standard form factor.

* * * * *